(12) United States Patent
Windl et al.

(10) Patent No.: US 7,010,753 B2
(45) Date of Patent: Mar. 7, 2006

(54) ANTICIPATING DROP ACCEPTANCE INDICATION

(75) Inventors: Helmut Windl, Bad Abbach (DE); Helmut Fritz, Nuremberg (DE); Larry Constantine, Rowley, MA (US)

(73) Assignee: Siemens Aktiengesellschaft, Munich (DE)

( * ) Notice: Subject to any disclaimer, the term of this patent is extended or adjusted under 35 U.S.C. 154(b) by 459 days.

(21) Appl. No.: 10/027,963

(22) Filed: Oct. 25, 2001

(65) Prior Publication Data

US 2002/0196271 A1 Dec. 26, 2002

Related U.S. Application Data

(60) Provisional application No. 60/243,821, filed on Oct. 27, 2000.

(51) Int. Cl.
*G09G 5/00* (2006.01)

(52) U.S. Cl. ............... 715/771; 715/769; 715/969; 715/970; 715/964; 715/965; 715/966

(58) Field of Classification Search ............ 345/769, 345/771, 964, 970, 965, 966; 395/969; 715/769, 715/771, 969, 970, 964–966
See application file for complete search history.

(56) References Cited

U.S. PATENT DOCUMENTS

| | | | |
|---|---|---|---|
| 5,168,441 A | | 12/1992 | Onarheim et al. ......... 364/146 |
| 5,608,860 A | * | 3/1997 | Fitzpatrick et al. ......... 345/826 |
| 5,638,505 A | * | 6/1997 | Hemenway et al. ......... 345/769 |
| 5,742,286 A | * | 4/1998 | Kung et al. ................. 345/839 |
| 5,754,179 A | * | 5/1998 | Hocker et al. .............. 715/835 |
| 6,083,277 A | * | 7/2000 | Fowlow et al. ............. 717/107 |
| 6,275,881 B1 | * | 8/2001 | Doege et al. ............... 710/301 |
| 6,362,839 B1 | * | 3/2002 | Hamilton et al. ........... 345/764 |
| 6,681,138 B1 | * | 1/2004 | Mohler et al. .............. 700/17 |
| 2002/0161777 A1 | * | 10/2002 | Smialek ...................... 707/102 |

FOREIGN PATENT DOCUMENTS

EP 0 747 804 A1 12/1996

OTHER PUBLICATIONS

Research Disclosure, No. 341, Emsworth, GB, Sep. 1992.
International Search Report, Dec. 11, 2002.

* cited by examiner

*Primary Examiner*—Ba Huynh
*Assistant Examiner*—Sara Hanne
(74) *Attorney, Agent, or Firm*—Baker Botts L.L.P.

(57) ABSTRACT

Permitting or prohibiting a drop is executed at the beginning of the drag-and-drop action initiated by the user, by mouse-clicking on the object to be dragged, for example. Thus, the drag-and-drop action is shown as a visual drop permission or prohibition in the relevant drop areas, such as a visual queue, for example, check mark, etc. In the preferred embodiment, and upon initiation of the action, the surface components display which areas, parts, elements or substructures can or cannot accept a given object or data element before a mouse pointer, arrow or cursor reaches or moves over the relevant areas, parts, elements or substructures.

15 Claims, 7 Drawing Sheets

ANTICIPATING DROP ACCEPTANCE INDICATION

PRIORITY

This is a utility patent application that claims priority to Provisional Application No. 60/243,821, filed Oct. 27, 2000.

FIELD OF THE INVENTION

The present invention relates to a method, system and apparatus for drop-enabled "hover" tabs, also referred to as "hover tabs" or "drag-enabled tabs" or "drag-enabled hover tabs".

RELATED INFORMATION

Tabbed dialogues or tabbed notebooks are a widely used technique for organizing the contents of complex user interfaces. As employed in conventional graphical user interface, such as MS Windows, tabbed dialogs/notebooks present the user with the appearance of a stack of "sheets" (Pages, panes, panels, or other collections) with associated "tabs" or visually projecting areas identifying each of the sheets. Tabs may take a variety of visual forms and may be arrayed within the tabbed dialog/notebook across the top, side, or bottom, or any combination thereof. Selection of a tab (for example, by clicking with a pointing device) causes the corresponding sheet and its associated tab to be displayed at the front of the stack, hiding or obscuring in whole or in part the contents of the other sheets.

FIG. 6 the current state of the art. Modules are presented in floating rack lists that must each be manually created and positioned by the user before it can be filled. Descriptions of modules appear in a separate table below that is neither visually connected nor synchronized with the rack lists. Modules are obtained from a tree view to the right, which, lists the name and part/order number of all Siemens PLC modules but reveals no details directly except for the selected module, which is described in a visually remote pane at the very bottom of the screen. Modules are parameterized through a separate tabbed dialog. The tabs and their contents are different for each kind of module. Note that the graphical form of the display simply follows Windows conventions with no connection to the real aspects of hardware configuration save for the tiny icons to the left of each list entry.

Conventional or previous versions of this technology have two significant shortcomings that restrict or reduce their usability and utility. First, they do not allow straightforward and efficient exploration of all the information contained in a tabbed dialog/notebook because each sheet must be selected separately and in succession (by clicking and releasing a button on a mouse or other pointing device, for example). Furthermore, to move or copy data or an object from one sheet to another within a conventional tabbed dialog/notebook requires a user to first select the data or object to be copied or moved on one sheet, then initiate a "copy" or "cut" operation, then select another sheet by clicking on its tab, then select the point of insertion within that sheet, then initiate a "paste" operation.

OBJECTS & SUMMARY OF THE INVENTION

The present invention introduces an enhancement that dramatically improves on conventional tabbed dialogs/notebooks by enabling users to more simply and directly explore all the contents of a tabbed dialog/notebook and to more simply and directly copy or move information among sheets within a tabbed dialog/notebook. The technique is both novel and non-obvious, and the improvement in utility and operational ease of use is significant and substantial.

This invention provides a novel form of tabbed interaction applies to all forms of graphical user interface features in which contents are organized into sheets, panes, panels, pages, or other visual collections identified by associated tabs regardless of the location, shape, or appearance of the associated tabs; in which some of the collections are partially or wholly hidden at any given time; and in which the display of the contents of any particular hidden or partially hidden collection is achieved by the user through interaction with the associated tab. What is provided is a non-obvious alteration to the behavior of the tabs in a tabbed dialog/notebook to overcome these limitations.

BRIEF DESCRIPTION OF THE PREFERRED EMBODIMENTS

DETAILED DESCRIPTION OF THE PREFERRED EMBODIMENT

The present invention is applicable to all forms of graphical user interface features. In any event, and solely for the sake of description, the present invention here shall be illustrated with reference to the automation industry. Therefore, and before a more detailed discussion of the invention is pursued, the automation industry, as it particularly applies to the instant case, shall first be discussed.

Most modern automation equipment is controlled by software running on specialized computers called Programmable Logic Controllers (PLCs). The systems controlled by PLCs vary tremendously, with applications in manufacturing, chemical process control, machining, transit, power distribution, and many other fields. Automation applications can range in complexity from a simple panel to operate the lights and motorized window shades in a conference room to a completely automated brewery in which the machinery for everything—from dispensing and mixing ingredients to controlling the brewing process and even filling and sealing of bottles—is under programmed control.

Figure 1:
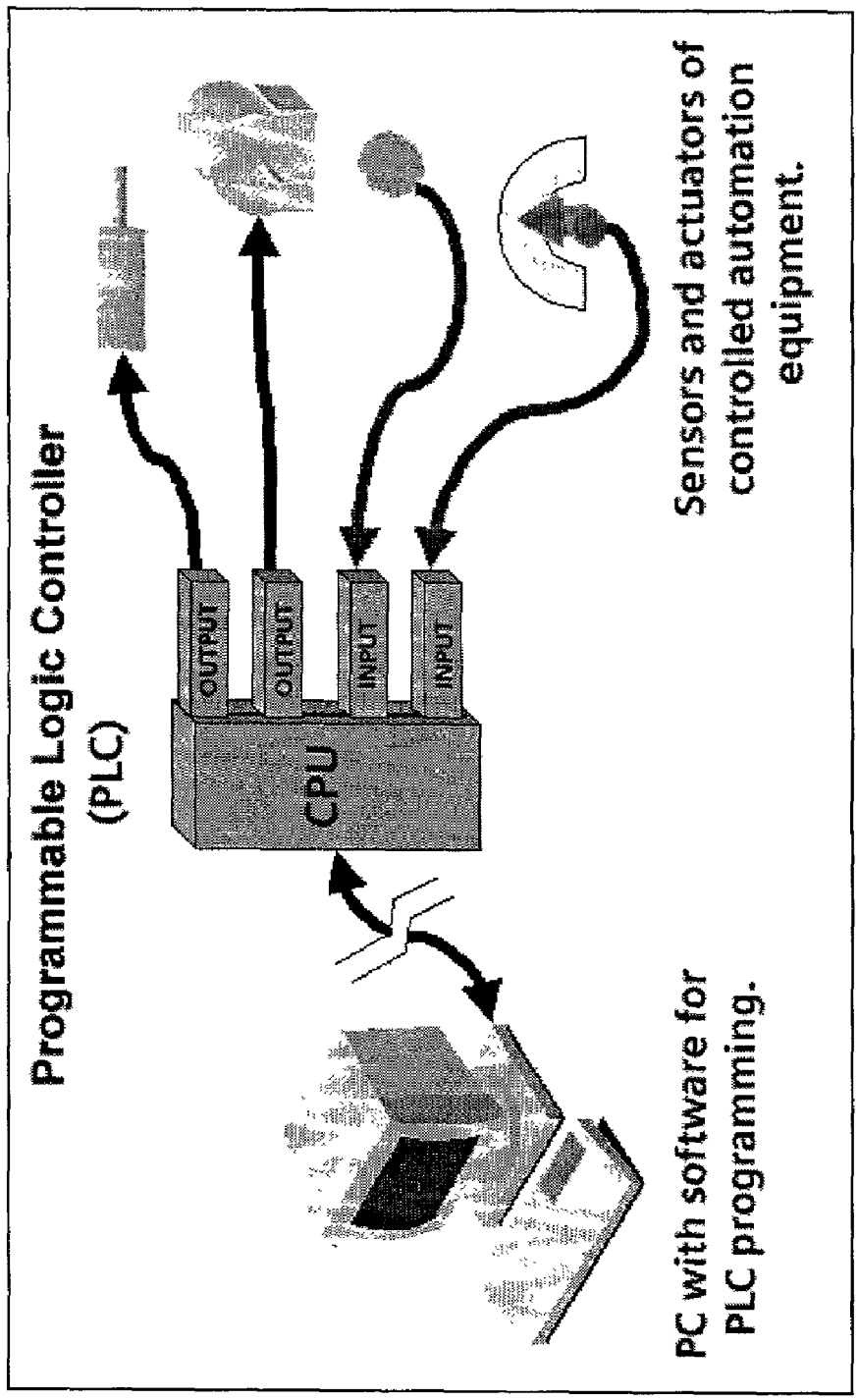
FIG. 1 shows the PLC configuration.

To support such highly varied needs, companies such as Siemens AG produce lines of modular computer components that can be combined and configured in many different ways to monitor and operate various equipment. In a representative system (FIG. 1), a Central Processor Unit (CPU) is combined with a number of input/output (I/O) modules that connect with sensors and actuators in the automation equipment itself. The programs that run on the PLC are planned, written, and debugged by automation programmers using development software running on conventional desktop or laptop computers or workstations. The programs produced through this development software must be downloaded to the PLC itself to operate the equipment.

Automation programming is an exacting engineering profession requiring great attention to detail, mastery of specialized concepts and terminology, and thorough and systematic discipline to avoid or eliminate errors. The risks associated with undiscovered errors in PLC code can be enormous. A lurking bug in a PLC program could destroy an expensive piece of material being machined, require the repair of costly equipment, or even lead to injury of personnel.

Siemens AG provides a software application that automates programming, called Step 7 Lite, which is a product derived and compatible with the Simatic Step 7 line of IDEs for automation programming which are provided by Siemens AG. The system supports programming of several Siemens product lines—S7 300, ET200S ET200X series—comprising comparatively simple PLC components. It is intended for more or less basic problems at the lower end of the range of PLC applications. Of course, the Step 7 application is not restrictive of the scope of the invention, but is merely used here as an illustration to describe the invention.

Problematically, nearly all existing IDEs for PLC programming have a very long learning curve. The slow accretion of features implemented by diverse teams at various times and the resulting lack of consistency among the various subsystems have added to difficulties in learning and mastery and to complications in use. Features and functionality have been the driving forces in PLC programming tools with relatively little attention paid to usability during design. Moreover, the roles of actual users and the detailed nature of their tasks have not been fully articulated to be reflected in user interface design.

Thus, the introduction of Step 7 Lite system is to primarily provide immediate usability by qualified but inexperienced users. In addition, the application offers flexible accommodation to a wide range of work styles and programming practices. With the Step 7 Lite, users experience a reduction of user errors. Another aspect is that Step 7 Lite increases in productivity through reduced user steps as well as reduced errors. Thus, there is a closer fit between the user interface and the way actual PLC programmers think and work. Therefore, leading to simplification of tasks where consistent with the need for great flexibility and with recognition of the inherent complexity and unpredictability of the PLC programming process.

In order to achieve the necessary high-levels of usability, flexible support, and performance efficiency, Step 7 Lite was developed through usage-centered design, a systematic model-driven process for designing applications based on the structure of user tasks. At the core of usage-centered design is a comprehensive and fine-grained task model representing user intentions and system responsibilities in the form of so-called use cases. This task model guides every aspect of the visual and interaction design for the user interface, including the design of custom components and novel behaviors.

At any rate, Step 7 Lite is an off the shelf system that needs not to be described in full detail here and any manuals which are available to the public regarding the intricacies of Step 7 are incorporated herein by reference. Suffice to say that a significant part of the process of programming an automation solution involves interactions between the programming system—the Step 7 Lite IDE in this case—and the particular configuration of hardware PLC components employed in the application.

In order to make full use of all features in the hardware, the IDE must know what modules are incorporated in the equipment and how they are interconnected. The process of setting up the IDE to conform to the PLC hardware in use is called hardware configuration. The IDE must be manually configured for the target PLC hardware because the actual hardware may be at a separate location or may not even exist when programming is begun. In practice, it is complicated for the user to configure the target. Because of this complexity, hardware configuration was a prime concern in designing the invention and, for that reason especially, the invention has in mind use by less experienced programmers building applications of limited sophistication on relatively simple components.

Figure 2:
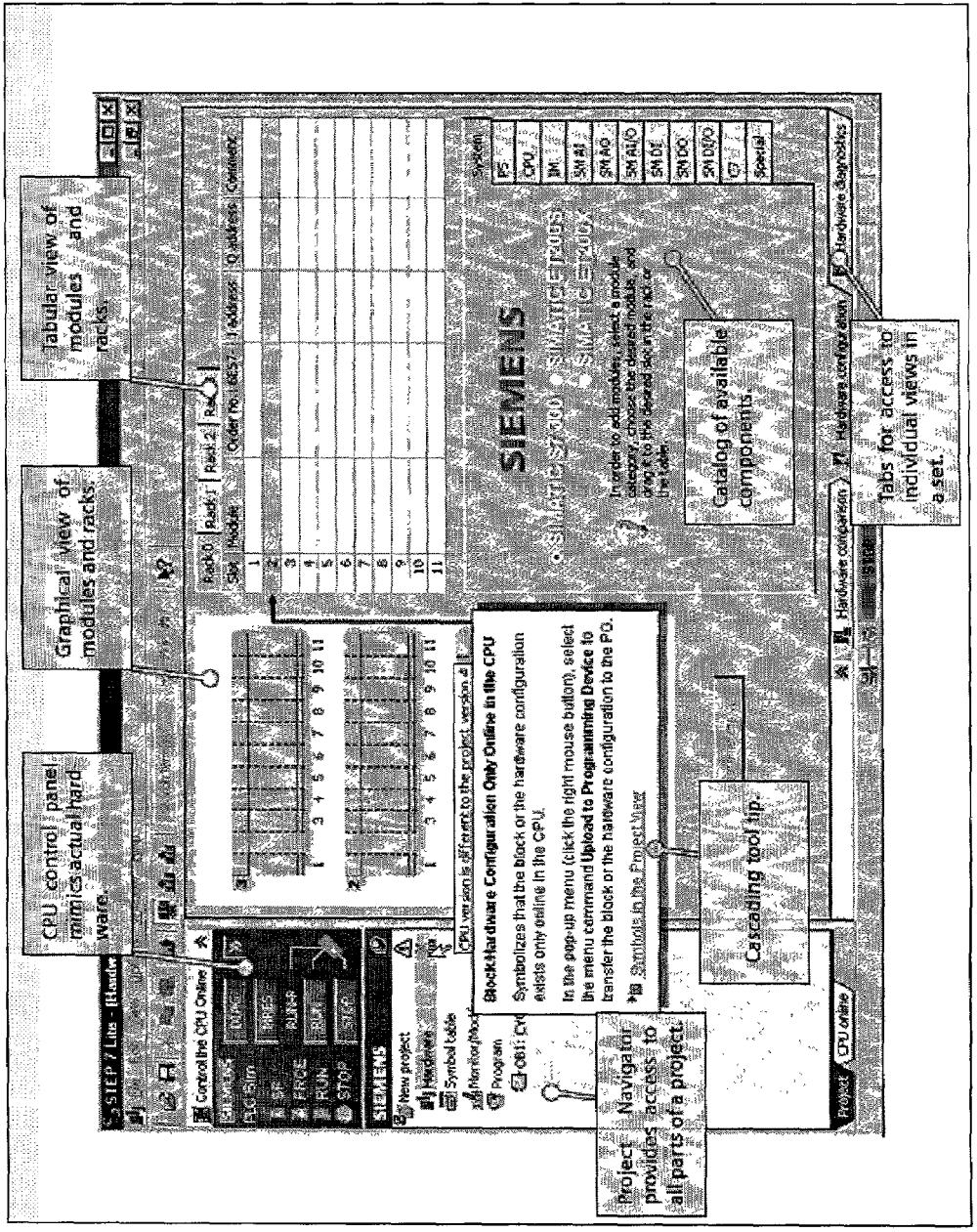
FIG. 2 shows a graphical representation of a PLC configuration tool.

The design of the Step 7 Lite support for the hardware configuration process is best understood within the context of the larger system. To promote productivity by PLC programmers, Step 7 Lite uses a flexible, multilevel navigation scheme offering simple, rapid access to any and all relevant views of the PLC application under development and direct switching among the various tasks of PLC programming (FIG. 2). A project navigator on the left gives access to sets of related views and task contexts, which are accessible through tabs toward the bottom of the screen. This scheme also minimizes window-management overhead, such as rearranging and resizing overlapping windows.

Recognizable physical and symbolic representations of actual equipment are used where appropriate to speed learning and reduce the probability of errors. This is not the silly or gratuitous use of "real-world" metaphor, as in Microsoft's infamous "Clippy" Office Assistant, but selected and carefully reasoned use of direct correspondence between the IDE and actual physical elements. For example, the control panel in the upper left of FIG. 2 mirrors the appearance and behavior of the actual front panel on Siemens CPU modules.

A novel performance-support feature employed throughout the Step 7 Lite system is the "cascading" tool tip (e.g., lower left of FIG. 2). Ordinary Windows-style tool tips provide only the briefest of messages. These may be adequate for simple identification of elements on a user interface, but often do not provide enough help or guidance for beginners. Cascading tool tips provide an added, more detailed or more advanced comment after an additional short delay. In Step 7 Lite, this secondary tip usually also includes an additional link into an appropriate entry in the main online help system.

Because configuring the hardware is required at the start, a new project begins with the Hardware Configuration view showing, as in FIG. 2. Hardware configuration can also be revisited by the PLC programmer as needed at any time. The hardware configuration process involves several distinct but interrelated subtasks. The modules to be included in the actual hardware are to be selected from among the available modules in the three series supported by Step 7 Lite. These include power supplies, CPUs, analog input and output, digital input and output, and specialized interface modules. In the actual equipment, the modules plug into specialized racks. The corresponding software representations within Step 7 Lite must be similarly located and interconnected. In addition, hardware modules have programmable settings or parameters whose values must be set in order to make use of the various features of the hardware.

Figure 3:
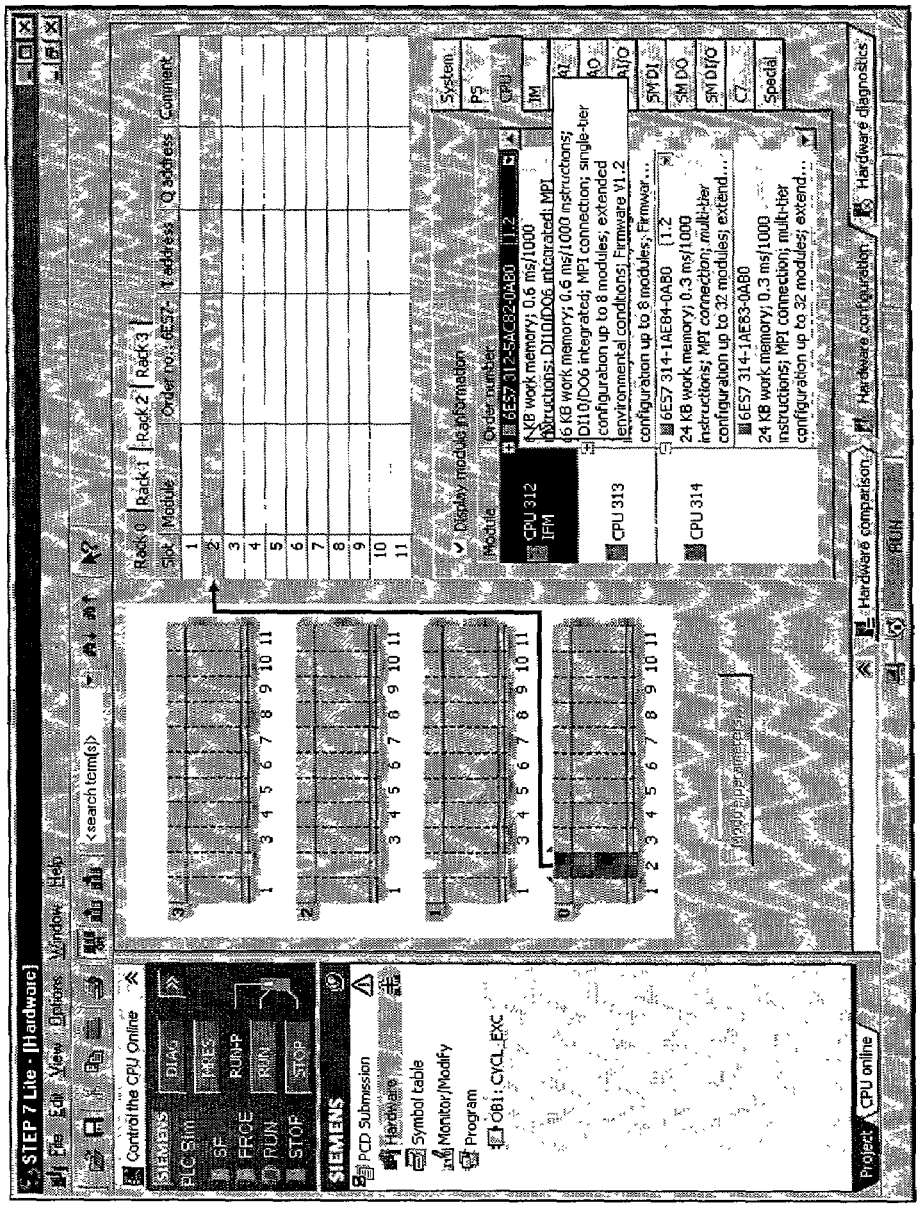
FIG. 3 shows a graphical representation of a PLC configuration tool.

The hardware racks are represented graphically to the left of the Hardware Configuration pane, with a tabular format provided in the upper right. The tabular display presents details regarding each included module while the graphic display corresponds to the physical arrangement and appearance of modules within racks. The two views are synchronized, allowing users to manipulate or review the configuration within whichever view is most convenient or best fits their style of interaction. A graphic element (the blue line, FIG. 3) connects the two views, thus enhancing the visual correspondence and facilitating interpretation by the user. This visual element, which follows the user's actions dynamically reduces the chances of the user accidentally manipulating the wrong component.

In the lower right is a catalog of available components from which the hardware configuration can be constructed. The terms and abbreviations—such as PS, CPU and so on—are the familiar jargon of PLC programmers and Siemens users; the order of the catalog tabs reflects a natural but not required order for task performance. The closed cover of the catalog allows selecting the component series of interest and provides a "starting hint" for the first-time user. A Windows XP-style one-time "balloon help" may be employed as a substitute.

Inside the catalog (see FIG. 3), the user has full control over the level of detail in presented information. Pop-up "tool tips" provide additional information when the user pauses over a catalog entry. Components can be inserted, copied, deleted, or moved within either the graphical or tabular view using any applicable standard Windows interaction idiom, such as drag-and-drop, copy-and-paste, target selection and double-clicking. However, the actual placement and interconnection of modules in real equipment is restricted by complex constraints, such as power supplies can only work in the first slot of a rack, multiple racks must be interconnected by certain interface modules that can only go in slot 3, etc. Step 7 Lite understands all these rules as well as the functions and characteristics of all supported modules, providing direct visual guidance to users.

Figure 4:
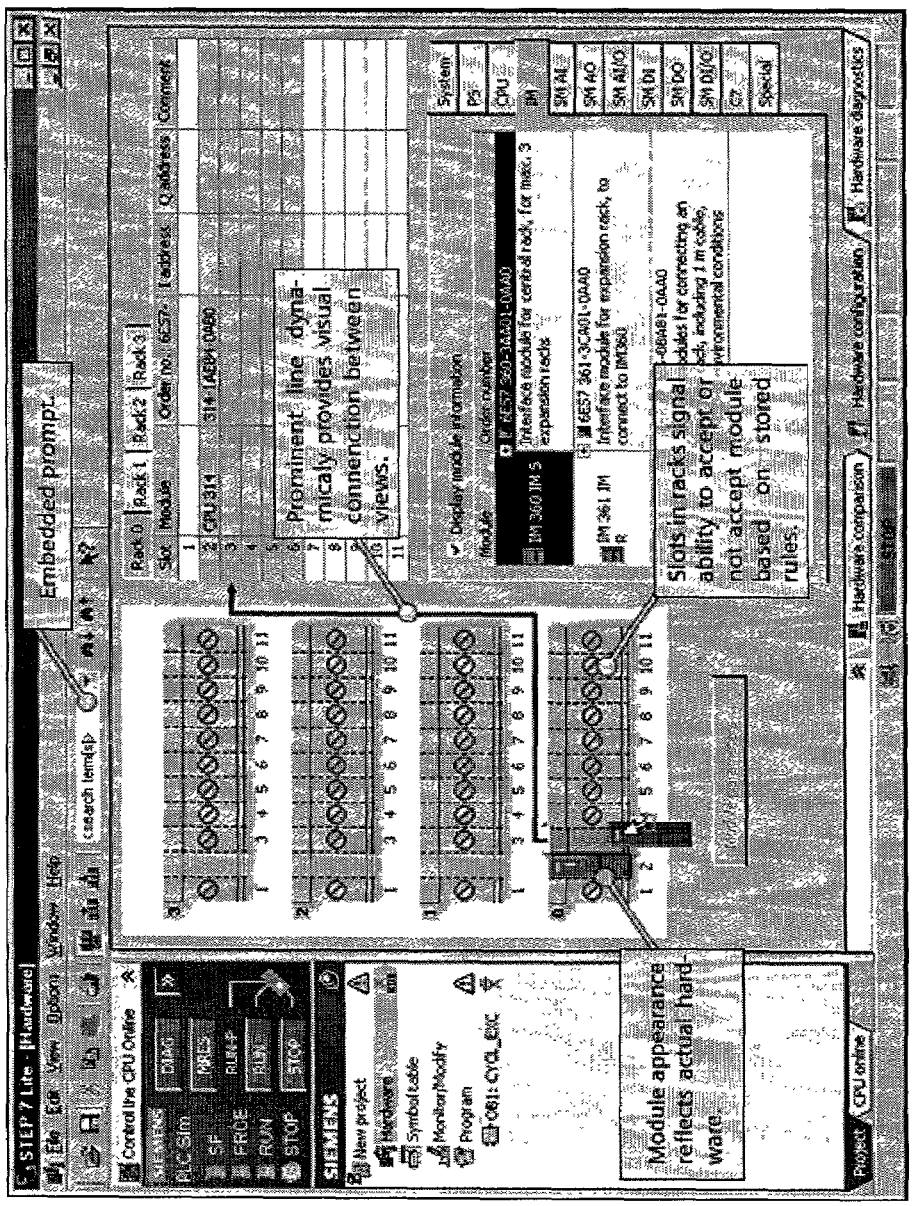
FIG. 4 shows a graphical representation of a PLC configuration tool.

For example, when a module is dragged within the graphical rack area, slots change appearance ("dynamic affordances and constraints") to indicate where the particular component can or cannot be inserted (see FIG. 4). This supports correct novice performance without interfering with highly experienced programmers who already know all these rules. In any case, incorrect operation is almost completely prevented. The system is also smart enough to allow expert users to rapidly and correctly accomplish a series of insertions in successive slots just by double-clicking or pressing the <Enter> key on a selected module in the catalog.

Figure 5:
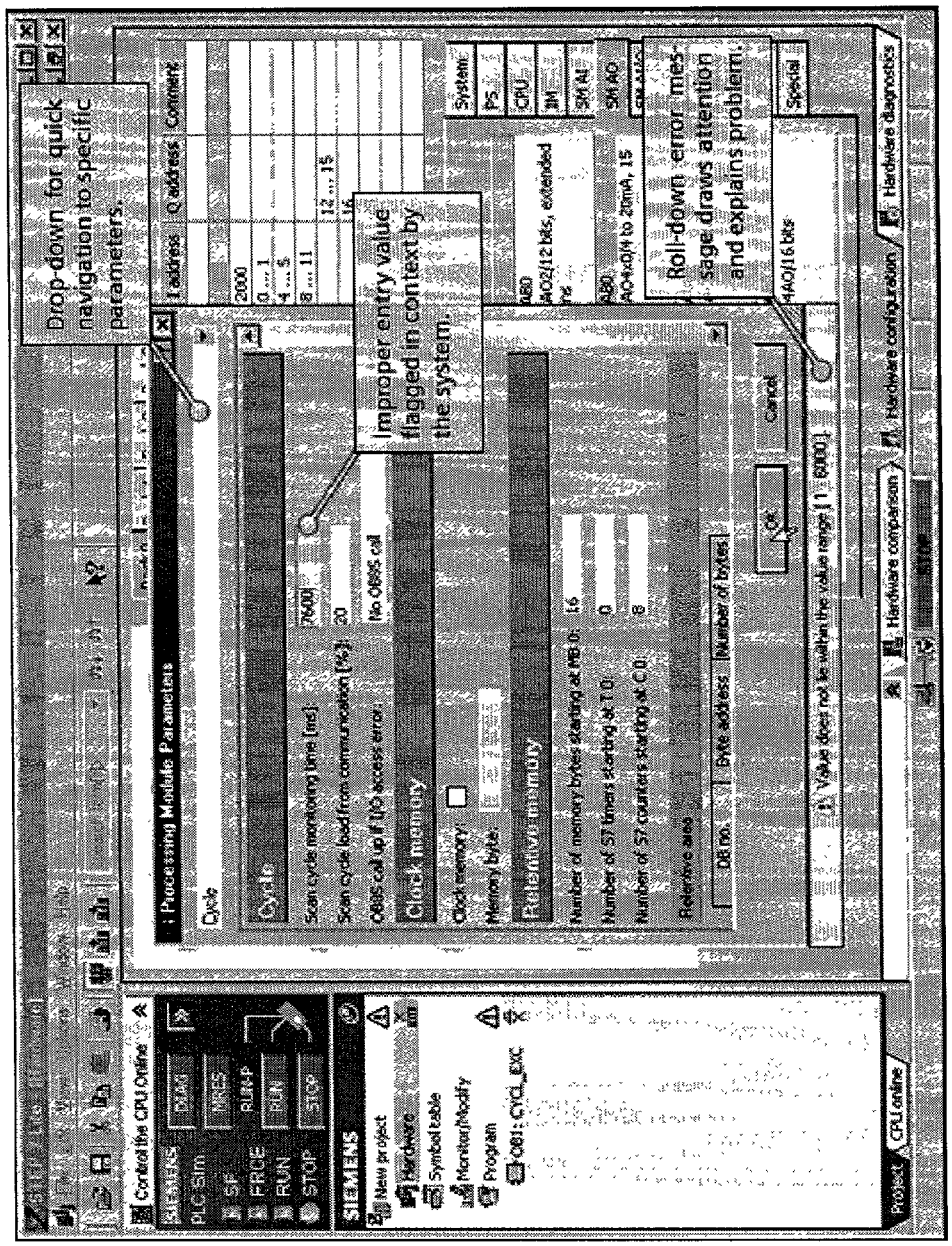
FIG. 5 shows a graphical representation of a PLC configuration tool.
Figure 6:
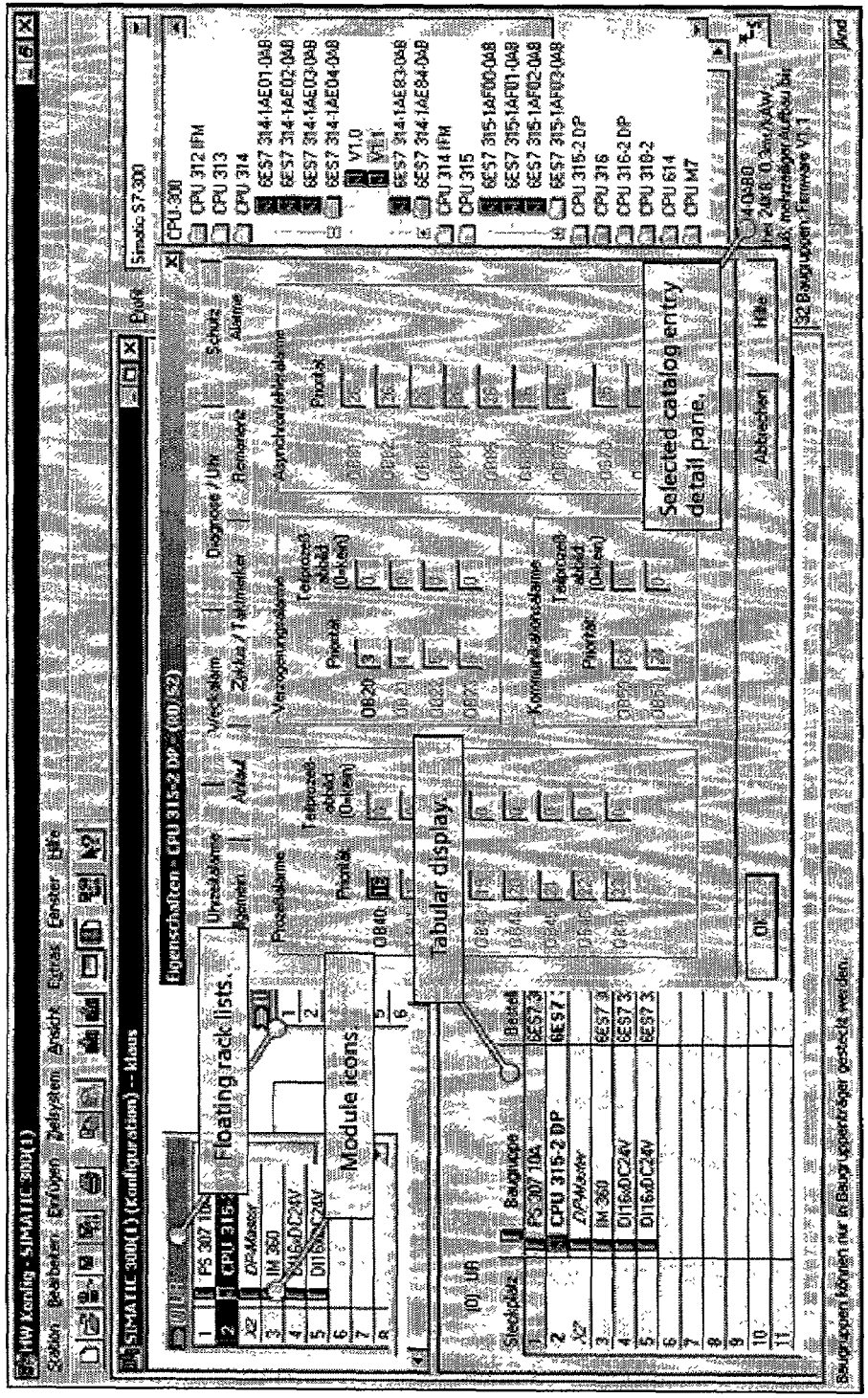
FIG. 6 shows the current state of the art.

To see and set parameters, modules can be "opened" by double-clicking or by selection and then clicking on the Module Parameter button (supporting expert and novice performance respectively). The scrolling control surface of the parameterization dialog (FIG. 5) supports a single navigation and interaction scheme for any set of parameters, which can range from a single parameter to hundreds and come in many different formats. User errors in parameterization are highlighted in place and explained in a highlighted message bar that rolls down from the lower edge of the dialog box. Thus feedback to the user is provided in context without overlaying or interrupting the visual context.

Browsing the contents of drop-enabled hover tabs will now be described. When a tab first receives focus, such as by a button-down condition from a pointing device positioned within the area bounded by the tab, the corresponding sheet becomes immediately selected and visually comes to the front of the stack of tabbed pages; if the mouse pointer leaves the area bounded by the tab and corresponding sheet before the button is released, the tabbed page is restored to its original position in the stack of tabbed pages; if the button is released while the mouse pointer is within the area bounded by the tab and corresponding sheet, the tab and sheet remain at the front of the visual stack. From the point of view of the user, the resulting behavior allows the user to browse or scan through all the contents of the tabbed dialog/notebook merely by clicking (mouse-down) on one of the tabs and moving the mouse pointer across the tabs. As soon as the mouse pointer leaves the area bounded by one tab and enters that of another, the former is restored to its original position and the latter is displayed at the front of the stack, visually replacing the former.

Drag-and-drop using drop-enabled hover tabs will now be described. Copying or moving data or objects between sheets in a tabbed dialog/notebook is vastly simplified by the same mechanism. If the mouse pointer moves over a hover tab while an object is being dragged (with a button held down), the corresponding sheet is immediately displayed at the front of the stack, allowing the user to continue to drag the object to the desired location within the tab. Thus a single continuous operation (drag-and-drop) replaces four separate user actions (copy/cut, select tab, select location, paste). Drag-and-drop is not only more efficient, but is also more natural and intuitive for users than copy/cut/paste. If the user releases the button while the pointer is still over the tab (rather than positioned within the main area of the corresponding sheet), the dragged object is automatically inserted in some location within the sheet determined by rules and conventions particular to the program or the tabbed dialog/notebook (such as at the end of a list or in the first empty slot, etc.)

When a user wishes to perform a drag-and-drop action in which an object can be dropped onto several visible areas and the drop permission depends on external conditions, with current systems the user can only determine whether a drop is possible when the drop object is positioned over one of the possible areas. In the past, this problem was resolved by changing the mouse pointer into a "No Go" sign when it is not possible to drag-and-drop an object onto another object. Problematically, this forces the user to test several possible objects and to initially drag the object over these other areas in order to find a place where a drop is possible.

Figure 7:
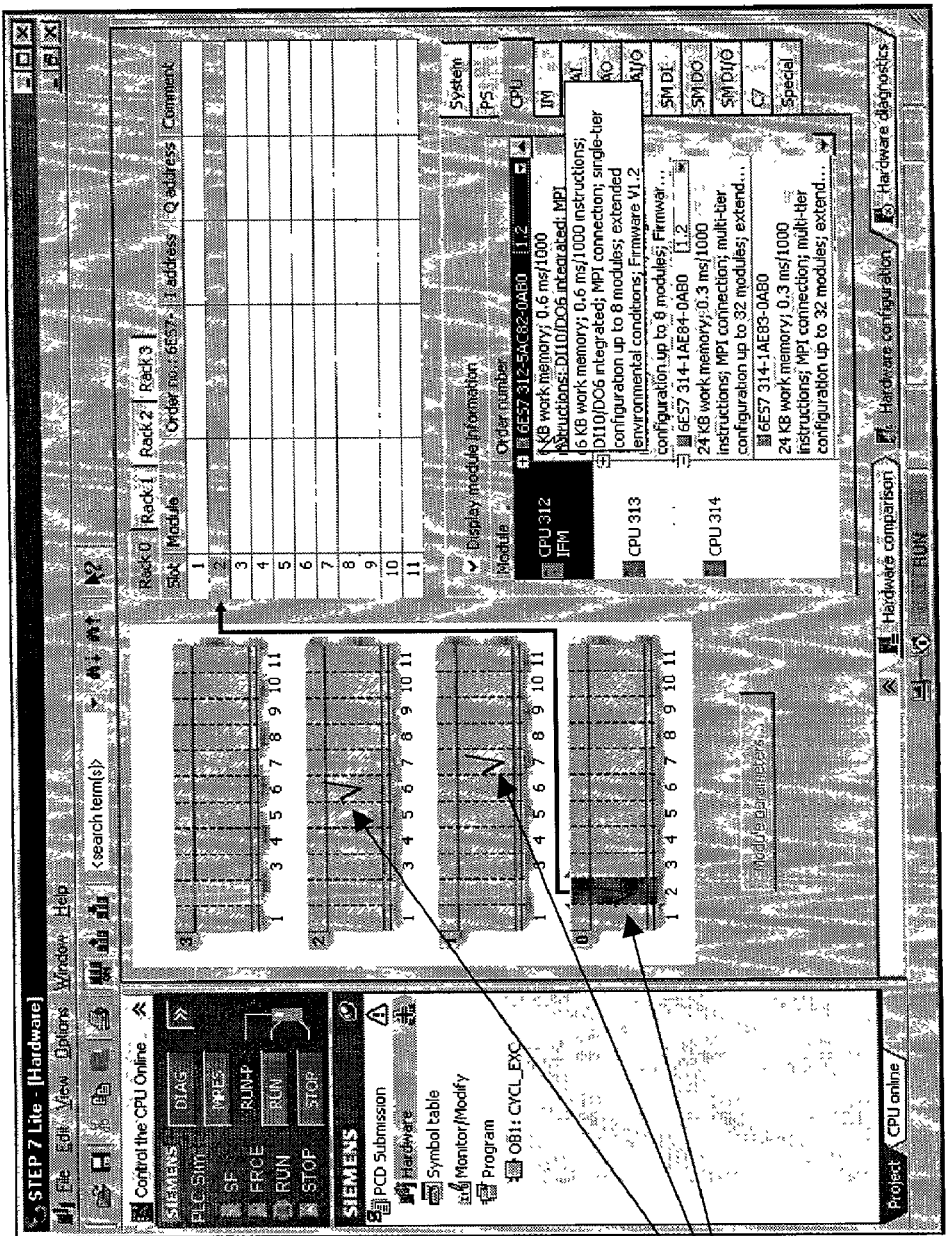
FIG. 7 shows a graphical representation of a PLC configuration tool.

The present invention provides a unique drag-and-drop shown in FIG. 7 that, when a drag-and-drop action is initiated, other surface components indicate whether or not they are able to accept the object to be dropped directly at the very moment when the drag-and-drop action is initiated. The rule that the invention implements for permitting or prohibiting a drop is executed at the beginning of the drag-and-drop action initiated by the user, by mouse-clicking on the object to be dragged, for example. Thus, the drag-and-drop action is shown as a visual drop permission or prohibition in the relevant drop areas, such as a visual queue, for example, check mark, etc. In the preferred embodiment, and upon initiation of the action, the surface components display which areas, parts, elements or substructures can or cannot accept a given object or data element before a mouse pointer, arrow or cursor reaches or moves over the relevant areas, parts, elements or substructures. Advantageously, the user realizes directly at the beginning of the drag-and-drop action that the dragged object can be dropped. Therefore, with the present invention, there is no need to "test" various other objects to find a place where a drop is possible. Additionally, the user is given information as to where other objects may be dropped. This is advantageous for designing a lay out on the fly, giving the user pre-information where other objects may be dropped.

In another aspect of the invention, there is provided a means for dropping an object into a register that is not apparent on the screen, i.e., a concealed register. In the past, a drag-and-drop action in which the user intended to drop an object in a concealed register necessitated the halting of the drop procedure. After which, the concealed register must be brought to the foreground and, finally, the drag-and-drop action must be repeated. In other words, a drag-and-drop operation between the individual pages of a registered dialog was completely impossible.

In the present invention, a drag-and-drop procedure does not need to be interrupted. In other words, the drop procedure to a concealed register can be accomplished during a registered dialog in a single closed handling sequence. In more detail, when the mouse cursor is moved over the register of a register dialog once a drop-and-drag action has been initiated, then the register under the mouse cursor is automatically moved to the foreground after a variable time interval, and the contents can thus be seen. Process of making the item visible is initiated just by locating the mouse over the register of the concealed registered dialog. The invention can be extended to normal mouse movements (that is to say that other than drag drop.) Dropping an object on to a drop destination in a concealed register of a register dialog for drag and drop actions and drag and drop between the registers of a tabbed dialog or the pages of a workbook (such as the various tables in Excel, for example.) Of course, the invention can be applied to all controls with registers, tabs, etc.

The present invention applies to any form or style of tabbed dialog/notebook presentation with any form of tabs using pointing device used with any number of buttons any of which are used alone or in combination or along with any keyboard keys (e.g., Alt, Ctrl, etc.). In addition, the present invention is applicable to application over networks, such as the Internet. For example, the invention is displayed through a web-browser and the information relating to the automation equipment is downloaded through the Internet.

By basing the design directly on a comprehensive and detailed task model, the user interface is able to offer users both highly structured guidance and complete performance flexibility along with improved performance efficiency. This approach also allows a single interface to be equally well suited to the needs of the rank novice and to those of the more experienced or expert user. Through guidance that is both intrinsic and in context, subtle help and reinforcement are provided for the beginner without getting in the way of those with more advanced needs and skills. Everything the user of any skill level needs in terms of tools and materials as well as guidance and feedback is provided in one readily comprehended context.

What is claimed is:

1. A computer program method for driving a computer processor for use with a graphics display device and for graphically representing, and facilitating a user in configuring, automation equipment, the automation equipment including a support having a plurality of receiving locations as well as a plurality of modules each capable of being coupled to the support in at least one of the receiving locations, the methods comprising the steps of:

displaying on the display in a graphics window device images and in a text window text information, each representative of the receiving locations of the automation equipment;

automatically visually indicating, immediately upon selection of a module, all receiving locations in said graphics window and respective text representations in said text window with which a module is capable of being associated;

wherein, the selection of a module triggers the indication of said all receiving locations to facilitate the user's relation of the selected module with an associated location in either said graphics window or said text window, and wherein a graphical link between a selected receiving location in the graphics window and the text window is displayed.

2. The computer program method of claim 1, wherein the automation equipment includes a rack having a plurality of slots, wherein each slot represents a receiving location, and a plurality of modules capable of being plugged into slots of the rack, the modules comprising electronic components, further comprising the step of associating each of the modules with at least one respective slot.

3. The computer program method of claim 2, wherein the step of associating associates the modules with respective slots based on respective characteristics of the modules.

4. The computer program method of claim 2, wherein the step of associating associates the modules with respective slots based on an architecture of the modules.

5. The computer program method of claim 2, wherein the indication that the slot is associated with a module is effected by modifying the graphical representation of the slot.

6. The computer program method of claim 2, wherein the relation of a selected module with an indicated receiving location is effected by relocating the representation of the selected model by means of a drag and drop procedure.

7. The computer program method of claim 2, further comprising the step of depicting the respective spatial appearances of the rack and of the module as relocated in the rack.

8. A computer implemented program apparatus for use with a graphics display device and for graphically representing, and facilitating a user in configuring, automation equipment, the automation equipment including a support having a plurality of receiving locations as well as a plurality of modules each capable of being coupled to the support in at least one of the receiving locations, the modules comprising means for:

displaying on the display in a graphics window device images and in a text window text information, each representative of the receiving locations of the automation equipment;

automatically visually indicating, immediately upon selection of a module, all receiving locations in said graphics window and respective text representations in said text window with which a module is capable of being associated;

wherein, the selection of the module triggers the indication of said all receiving locations to facilitate the user's relation of the selected module with an associated location in either said graphics window or said text window, and wherein a graphical link between a selected receiving location in the graphics window and the text window is displayed.

9. The computer program apparatus of claim 8, wherein the automation equipment includes a rack having a plurality of slots, wherein each slot represents a receiving location, and a plurality of modules capable of being plugged into slots of the rack, the modules comprising electronic components, each of the modules with at least one respective slot.

10. The computer program apparatus of claim 9, wherein the modules are associated with respective slots based on respective characteristics of the modules.

11. The computer program apparatus of claim 9, wherein the modules are associated with respective slots based on an architecture of the modules.

12. The computer program apparatus of claim 9, wherein the indication that the slot is associated with a module is effected by modifying the graphical representation of the slot.

13. The computer program apparatus of claim 9, wherein the relation of a selected module with an indicated receiving location is effected by relocating the representation of the selected model by means of a drag and drop procedure.

14. The computer program apparatus of claim 9, wherein the respective spatial appearances of the rack and of the module as relocated in the rack are displayed by the display device.

15. The computer program apparatus of claim 8, wherein said display comprises a web-browser that displays the modules from information downloaded through the internet.

* * * * *